United States Patent
Schach et al.

[11] 3,807,384
[45] Apr. 30, 1974

[54] APPARATUS FOR CONTROLLING THE TEMPERATURE OF BALLOON-BORNE EQUIPMENT

[75] Inventors: Milton Schach, Oxon Hill; Jack J. Triolo, College Park, both of Md.

[73] Assignee: The United States of America as represented by the Administrator of the National Aeronautics and Space Administration, Washington, D.C.

[22] Filed: Aug. 14, 1972

[21] Appl. No.: 280,305

[52] U.S. Cl..................... 126/270, 244/31, 244/127
[51] Int. Cl............................................... F24j 3/02
[58] Field of Search ............ 126/270, 271; 237/1 A; 244/30, 31, 127

[56] References Cited
UNITED STATES PATENTS

| | | | |
|---|---|---|---|
| 3,295,512 | 1/1967 | McCusker | 126/270 |
| 3,244,186 | 4/1966 | Thomason | 126/270 X |
| 3,208,447 | 9/1965 | Laszlo | 126/270 |
| 761,596 | 5/1904 | Moss | 126/271 |
| 2,506,755 | 5/1950 | Watson | 126/270 X |
| 3,029,596 | 4/1962 | Hanold | 126/270 X |
| 3,220,671 | 11/1965 | Ashman | 126/270 X |
| 3,337,162 | 8/1967 | Bauserman | 244/31 |

Primary Examiner—Carroll B. Dority, Jr.
Assistant Examiner—Peter D. Ferguson
Attorney, Agent, or Firm—R. F. Kempf

[57] ABSTRACT

A novel apparatus for controlling the temperature of balloon-borne equipment is disclosed, the apparatus serving to utilize the radiant energy emitted by the earth and its atmosphere so as to control the temperature of equipment such as batteries and electronic instrumentation packages. In the preferred inventive embodiment, the apparatus comprises a housing adapted to be carried aloft by a balloon and defining an enclosure for an instrumentation package that is placed therein. The enclosure includes an upper shield portion as well as a bottom window portion at the base thereof, the bottom window portion facing the earth below during flight. The upper shield portion is constructed of a material such as aluminized Mylar, which serves to reflect direct sunlight. The bottom window portion is preferably constructed of a material such as polyethylene which allows heat and long wave radiation emitted by the earth and its atmosphere to pass into the enclosure. The shape of the enclosure is such that the long wave radiation passed through the bottom window is reflected by the inside wall of the upper shield portion towards the instrumentation package. The heat radiated by the instrumentation package itself is likewise reflected and returned towards the package. The enclosure itself defines a means whereby heat loss by convection is reduced. In the preferred inventive embodiment, the enclosure will be seen to have the shape of a cone. The utilization of the apparatus of the instant invention effects stable temperature control of an electronic instrumentation package placed therein, both during nighttime and daylight operation, without the necessity of providing any internal heat source.

7 Claims, 2 Drawing Figures

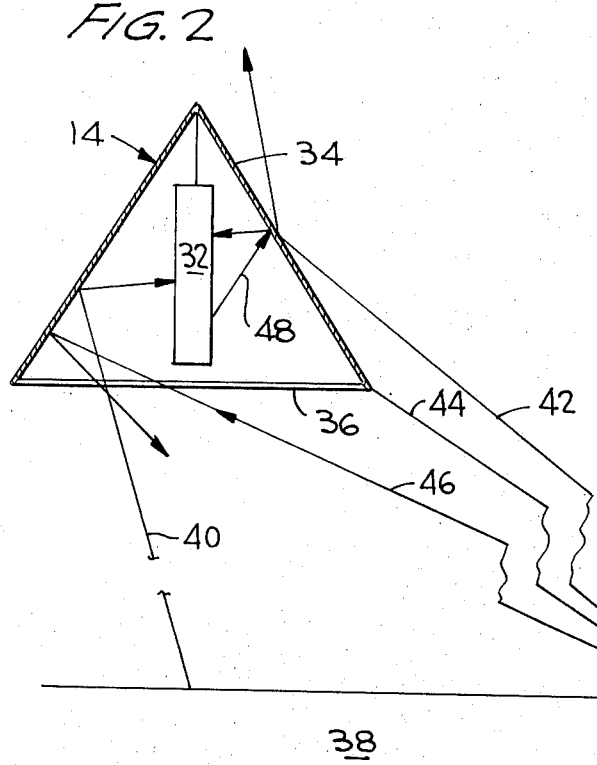
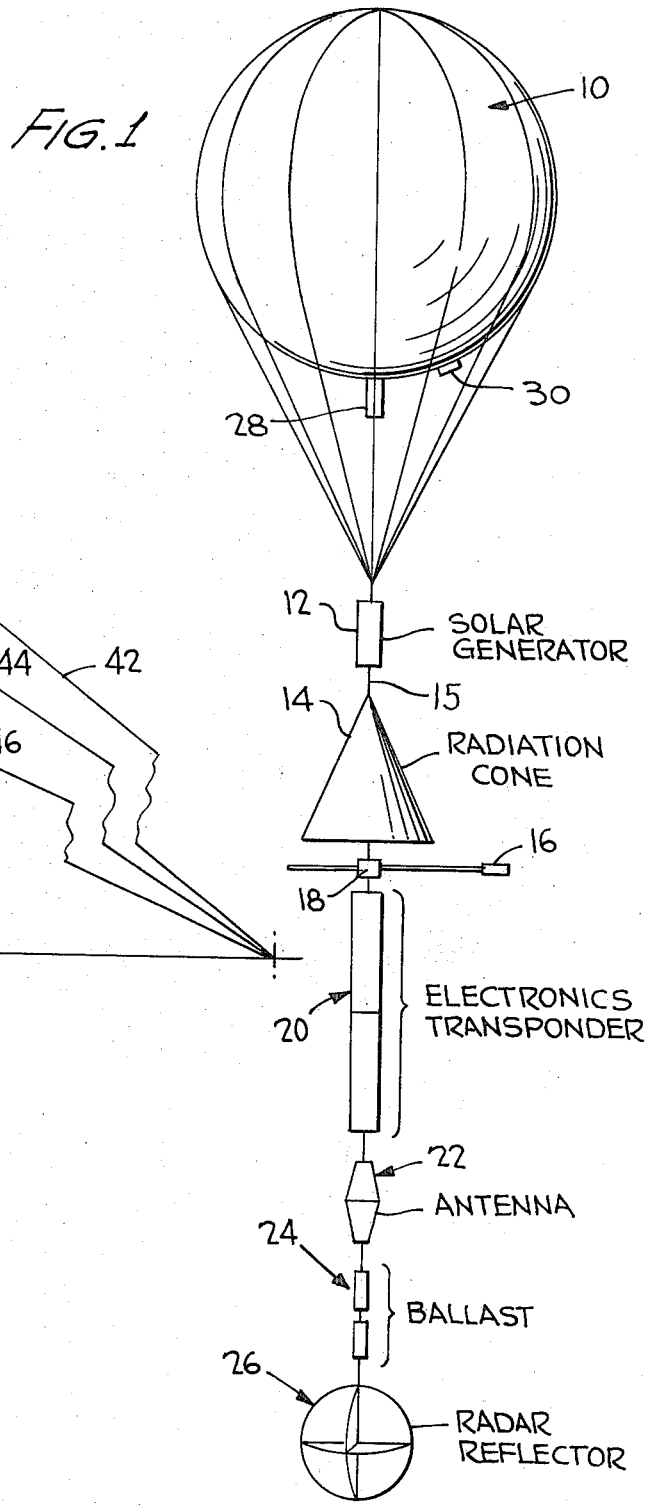

APPARATUS FOR CONTROLLING THE TEMPERATURE OF BALLOON-BORNE EQUIPMENT

ORIGIN OF THE INVENTION

The invention described herein was made by employees of the United States Government and may be manufactured and used by or for the government for governmental purposes without the payment of any royalties thereon or therefor.

BACKGROUND OF THE INVENTION

This invention generally relates to temperature control devices and particularly concerns an apparatus in the form of a specially constructed enclosure adapted to be carried aloft by a balloon for controlling the temperature of balloon-borne equipment such as batteries and electronic instrumentation packages placed therein.

Whenever high altitude balloons containing electronic instrumentation packages are flown, some form of temperature control is required to prevent excessive heating and/or cooling of the electronic instrumentation package. As can be appreciated, wide thermal variations occur at such high altitudes, particularly as concerns the daytime versus nighttime temperature differentials encountered. In addition to these temperature differentials, at high altitudes above 7,500 meters over a wide range of latitudes and for a significant portion of the year, air temperatures as low as −50°C or below occur. The temperature variations as well as the relatively low absolute temperatures encountered make temperature control of the air-borne electronic instrumentation package a necessity, and particularly dictates the need for an additional heat source which is specifically effective to maintain temperatures above the ambient during nighttime operation.

Considering this well-known necessity of maintaining temperature control of air-borne electronic instrumentation packages, it is not surprising that many attempts have been made in the prior art to satisfy this need. For example, housings of one form or another are usually provided for enclosing the electronic instrumentation package or battery that is air-borne. Within such housings, internal heat sources such as radio-isotopes, batteries and heater circuits are typically provided. This technique of nighttime temperature control is not entirely suitable for all applications, however. In this respect it can be appreciated that radio-isotope heat sources present radiation handling problems and are relatively expensive. Further, such radio-isotope heat sources typically are of a weight higher than can be easily handled considering the low mass-area ratio requirement of any air-borne housing itself. The battery and heater circuit heat source technique is also inadequate to solve the nighttime temperature problem in that such sources themselves can be adversely affected by operation at the low temperatures that exist.

A further approach made by the prior art in attempting a solution to the temperature control problem above-described is the provision of massive thermal insulation about the housing so as to reduce heat loss thereby preventing the excessive cooling of the electronic instrumentation package during the night. With such systems, the amount of solar energy absorbed during the day and the amount of heat energy emitted or lost at night can be controlled thus effecting a temperature regulation. While in principle thermal insulation can solve a heat regulation problem, thermal insulation cannot be utilized very effectively in airborne environments due to the bulk and weight by which the housing or enclosure cannot meet the low mass-area ration requirement.

SUMMARY OF THE INVENTION

It is thus apparent that a need still exists in the art for a technique and apparatus by which the temperature of balloon-borne equipment such as batteries and electronic instrumentation packages can readily be controlled. It is the primary objective of the instant invention to provide such an improved technique and apparatus.

It is a further object of the instant invention to provide an apparatus for controlling the temperature of balloon-borne equipment, which apparatus does not require any additional internal heat source to supply the needed energy to maintain nighttime equipment temperature levels.

It is still another objective of the instant invention to provide an apparatus for controlling the temperature of balloon-borne equipment, which apparatus is extremely light in weight and does not tax the balloon load capability, thus meeting the mass-ratio requirements above-discussed.

A further objective of the instant invention concerns the provision of an apparatus of the type described which can be constructed of readily available and relatively inexpensive materials.

It is yet another objective of the instant invention to provide an apparatus for controlling the temperature of balloon-borne equipment, which apparatus is constructed in a fashion so as not to constitute a hazard to aircraft, the apparatus being relatively small in dimension.

These objectives as well as others which will become apparent as the description proceeds are implemented by the instant invention which, as aforestated, constitutes an apparatus for controlling the temperature of balloon-borne equipment such as batteries and electronic instrumentation packages.

In the preferred inventive embodiment, the apparatus comprises a housing means adapted to be carried aloft by a balloon and which defines an enclosure for an instrumentation package placed therein. The enclosure itself includes an upper shield portion as well as a bottom window portion at the base thereof, which bottom window portion faces the earth below during flight.

Importantly, the bottom window portion defines a means which is substantially transparent to heat and long wave radiation emitted from the earth and its atmosphere, the significance of which will become apparent herein below. The upper shield portion of the enclosure is constructed of a material which serves to substantially reflect incident external heat radiation such as from the sun, and which further serves to reflect any heat radiation emitted by the instrumentation package within the enclosure, and direct such heat radiation back towards the instrumentation package.

Further, the upper shield portion of the instant inventive enclosure is constructed of a shape, such as a cone, such that incident radiation passing through the bottom window portion is reflected towards the instrumentation package disposed within the enclosure, this cone-shaped construction of the upper shield portion also effecting the "bounce-back" of heat radiation emitted by the instrumentation package itself as above-discussed.

As is apparent, the enclosure of the instant invention is simple in construction and, from the standpoint of choice of materials to be utilized, the preferred inventive embodiment contemplates the provision of a thin film of polyethylene for the bottom window, and a slightly thicker film of Mylar, aluminized on both sides, for the upper shield portion. Other suitable materials can, of course, be substituted therefor.

In operation, the instant inventive device serves to utilize the radiant energy emitted by the earth and its atmosphere to maintain adequate internal temperatures during the nighttime, while reflecting direct sunlight by day. In this respect, it should be appreciated that the infrared or long wave heat radiation emitted by the earth and its surrounding atmosphere is substantially constant at the altitudes of interest and this long wave or infrared heat radiation passes through the bottom window portion disposed at the base of the enclosure, the heat radiation then being reflected by the inner surface of the upper shield portion towards the electronic instrumentation package disposed within the enclosure. The upper shield portion of the enclosure, being constructed to have a higher reflectance surface, serves to reflect direct sunlight and thereby reduce the daytime temperature. As a net result, through the provision of the enclosure of the instant invention, the temperature variation of the air-borne electronic instrumentation package is reduced and the instrumentation package is heated during nighttime operation so as to avoid the adverse low temperatures of the ambient environment.

BRIEF DESCRIPTION OF THE DRAWINGS

The invention itself will be better understood and additional features and advantages thereof will become apparent from the following detailed description of a preferred inventive embodiment, such description making a reference to the appended single sheet of drawings wherein:

FIG. 1 is a schematic illustration of an air-borne balloon package carrying the apparatus of the instant invention as well as other typical apparatus usually flown therewith; and FIG. 2 is an elevational view, in section for illustrative clarity, of the novel temperature controlling apparatus of the instant invention.

DETAILED DESCRIPTION OF THE PREFERRED INVENTIVE EMBODIMENT

Referring now to the drawings, in particular to FIG. 1 thereof, a typical balloon package is illustrated, such package comprising a balloon generally designated by a reference numeral 10 to which is coupled a solar generator 12 for providing electrical power, the balloon-borne package containing the electronic instrumentation or batteries designated "Radiation Cone" and indicated by reference numeral 14. A temperature sensor 16 and a pressure sensor 18 is likewise provided, as is an electronics transponder generally designated by reference numeral 20. Attached to the transponder 20 is an antenna 22, ballast 24 for the balloon, and a radar reflector 26. A super-pressure sensor 28 can be provided adjacent the balloon 10 and, connected thereto, a destruct mechanism 30 can be provided.

The overall balloon package construction as above-described is generally typical of the art and has been illustrated primarily to show the environmental utility of the apparatus for controlling the temperature of the balloon-borne electronic instrumentation package designated as the "Radiation Cone" in FIG. 1 and indicated by reference numeral 14.

Referring now to FIG. 2 of the drawings, the detailed and preferred construction of the apparatus of the instant invention can be seen. The apparatus 14 generally comprises a housing means adapted to be carried aloft by a balloon 10 and defining an enclosure for an instrumentation package designated by reference numeral 32 disposed or placed therein. Instrumentation package 32 can comprise electronic circuitry, sensors and/or batteries as is typical. The enclosure substantially consists of two major components. The first component can be seen to constitute an upper shield portion 34 which, in the preferred inventive embodiment, is substantially conical in shape and constructed of a material providing a high reflectance surface, such as one mil to five mils thick Mylar having a thin metallized film of aluminum, for example, deposited on both the external and internal surfaces thereof. The purpose of the upper shield portion 34 is to reflect direct sunlight as well as to direct heat radiation entering the enclosure from the lower portion thereof towards the instrumentation package 32 as will be described herein below. As such, it can be appreciated by those skilled in the art that other materials can be substituted for the upper shield portion 34 such as a thin film of other suitable plastics coated with vacuum deposited opaque films of other metals such as gold to a thickness of 1,000 Angstroms, for example. Further, the shape of the upper shield portion 34 need not be that of a cone, but could also be cylindrical in shape or some other optimum geometry as determined experimentally.

The base 36 of the novel enclosure or apparatus 14 constitutes a bottom window portion which, during flight of the apparatus, faces the earth below, the earth generally being designated by reference numeral 38. As shown in FIG. 1 of the drawings, the requisite in-flight orientation of the apparatus with the bottom window portion facing the earth below is readily achieved by the provision of a line 15 or other expedient to couple the housing 14 to the balloon 10 above. The bottom window portion 36 defines means substantially transparent to heat and long wave radiation emitted by the earth and its atmosphere whereby such long wave radiation passes into the enclosure 14 to effect heating of the instrumentation package 32 therein. In this respect, a material suitable for use as the base window portion comprises a thin film of polyethylene of approximately 1 mil thickness, such material substantially passing infrared or long wave heat radiation without significant attenuation.

The structure as above described has been found to increase the fraction of heat energy that is incident on the instrument package and reflects a fraction of the heat radiation energy emitted by the instrument package back to the package thereby resulting in a temperature increase of the instrument package of up to 20°C above the ambient temperature. The manner of operation can readily be gleaned from a further inspection of FIG. 2.

In this respect, infrared and other long wave heat radiation emitted by the earth and its atmosphere from an area substantially below the air-borne enclosure 14 and schematically illustrated by the arrow designated with reference numeral 40 passes through the bottom window 36 of the enclosure 14, is reflected by the internal surface of the upper shield portion 34, and is directed toward and into the electronic instrumentation package 32, thus effecting a heating of the same. Other remote sources of heat radiation such as direct sunlight and the like schematically illustrated by the group of arrows indicated by reference numerals 42, 44, and 46, either are reflected off of the external coating or surface of the upper shield portion 34 such as radiation "rays" 42 and 44, or may pass into the enclosure through the bottom window portion 36 only to be reflected back out by the reflective internal surface of the upper shield portion 34, such as radiation ray 46. Due to the reflective construction of the external skin or coating of the upper shield portion 34, direct sunlight is reflected off the enclosure 14, thus reducing the daylight temperature of the instrumentation package 32 therein. Yet, and as has been described, infrared or other long wave heat radiation emitted by the earth below the apparatus 14 passes through the bottom window 36 and, due to the reflective properties of the internal surface or coating of the upper shield portion 34, are reflected towards the instrumentation package 32 to effect heating.

In addition, the internal reflective surface or coating of the upper shield portion 34 and, in particular, the geometric construction thereof, is such that any heat generated by the instrumentation package 32 itself, such heat being schematically illustrated by arrow 48, is directed back towards the instrumentation package 32 in a form of "self-heating." It should further be appreciated by those skilled in the art that the overall construction of the enclosure or apparatus 14 is such that heat loss from the enclosure by means of convection is substantially reduced.

In an alternative modified embodiment of the instant invention, the bottom window portion 36 could be constructed of a germanium material which, similar to polyethylene, allows long wave or infrared radiation to pass thereghtough, but is impervious to visible light such as direct sunlight.

In summary, and in a simple fashion, the instant inventive enclosure effects temperature control of an airborne electronic instrumentation package placed therein by increasing the fraction of energy which originates in the near region below the enclosure that is incident on the device, by reducing a portion of the energy originating from remote regions, and by reflecting a portion of radiation emitted by the instrumentation package itself back to the package, thereby reducing the heat loss.

From the foregoing detailed description, it should therefore be apparent that all the objectives set forth at the outset of this specification have been successfully achieved. Moreover, while there has been shown and described a present preferred embodiment of the invention, it is to be distinctly understood by those skilled in the art that the invention is not limited thereto, but may otherwise may be variously embodied and practised within the scope of the following claims.

Accordingly, what is claimed is:

1. An apparatus for controlling the temperature of balloon-borne equipment such as batteries and electronic instrumentation packages, said apparatus comprising a housing means adapted to be carried aloft by a balloon and defining an enclosure for an instrumentation package placed therein at a central region thereof, said enclosure including an upper shield portion and a bottom window portion at the base thereof, means for coupling said housing means to a balloon such that said bottom window portion faces the earth below during flight, said bottom window portion defining means substantially transparent to heat and long wave radiation emitted by the earth and its atmosphere, whereby said radiation passes into said enclosure to effect heating of the instrumentation package therein; said upper shield portion having a coating on the external side thereof defining means for substantially reflecting incident external heat radiation from the sun, whereby the daytime temperature of the instrumentation package therein is reduced; and a coating on the internal side of said upper shield portion deinfing means for substantially reflecting incident heat radiation; said shield portion of said enclosure being shaped so that long wave radiation passing through said bottom window portion at the enclosure base into the interior of said enclosure is reflected by said internal coating toward the central region and so that heat radiation emitted from the interior of said shield portion is reflected back toward the central region thereof.

2. An apparatus as defined in claim 1, wherein said enclosure is constructed of material substantially reducing convection heat loss from the interior thereof.

3. An apparatus as defined in claim 1, wherein said bottom window portion further defines means substantially impervious to visible radiation.

4. An apparatus as defined in claim 1, wherein said upper shield portion of said enclosure is shaped substantially as a cone.

5. An apparatus as defined in claim 1, wherein said bottom window portion is constructed of polyethylene of approximately one mil thickness, and wherein said upper shield portion is constructed of Mylar having a thickness substantially within the range of 1 to 5 mils and having an aluminized coating on both sides thereof.

6. An apparatus as defined in claim 1, wherein said bottom window portion is constructed of a plastic of approximately 1 mil thickness, and wherein said upper shield portion is constructed of a plastic having a thickness substantially within the range of 1 to 5 mils and having a metallized coating on both sides thereof.

7. An apparatus as defined in claim 1, wherein said bottom window portion is constructed of a germanium material, and wherein said upper shield portion is constructed of plastic having a thickness substantially within the range of 1 to 5 mils and having a metallized coating on both sides thereof.

* * * * *